United States Patent
Moreso et al.

(10) Patent No.: US 12,168,708 B2
(45) Date of Patent: Dec. 17, 2024

(54) FUNCTIONAL DIENE ELASTOMER AND RUBBER COMPOSITION

(71) Applicant: COMPAGNIE GENERALE DES ETABLISSEMENTS MICHELIN, Clermont-Ferrand (FR)

(72) Inventors: Emma Moreso, Clermont-Ferrand (FR); Kahina Mammeri, Clermont-Ferrand (FR); Anne-Frédérique Salit, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 782 days.

(21) Appl. No.: 17/292,279

(22) PCT Filed: Nov. 7, 2019

(86) PCT No.: PCT/FR2019/052647
§ 371 (c)(1),
(2) Date: May 7, 2021

(87) PCT Pub. No.: WO2020/094993
PCT Pub. Date: May 14, 2020

(65) Prior Publication Data
US 2021/0403627 A1 Dec. 30, 2021

(30) Foreign Application Priority Data
Nov. 9, 2018 (FR) ...................................... 1860355

(51) Int. Cl.
| | | |
|---|---|---|
| *C08F 279/02* | (2006.01) | |
| *B60C 1/00* | (2006.01) | |
| *C08F 236/06* | (2006.01) | |
| *C08K 3/04* | (2006.01) | |
| *C08K 3/36* | (2006.01) | |

(52) U.S. Cl.
CPC .............. *C08F 279/02* (2013.01); *B60C 1/00* (2013.01); *C08F 236/06* (2013.01); *C08K 3/04* (2013.01); *C08K 3/36* (2013.01)

(58) Field of Classification Search
CPC ........ C08F 279/02; C08F 236/06; B60C 1/00; C08K 3/04; C08K 3/36; C08L 9/00; C08L 7/00
USPC ........................................................ 524/572
See application file for complete search history.

(56) References Cited

U.S. PATENT DOCUMENTS

| | | |
|---|---|---|
| 6,569,799 B1 | 5/2003 | Barbotin et al. |
| 10,137,734 B2 | 11/2018 | Gander et al. |
| 10,435,485 B2 | 10/2019 | Fleury et al. |
| 10,844,149 B2 | 11/2020 | Pacheco et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2015/0353716 A1 | 12/2015 | Thuilliez et al. |
| 2016/0251456 A1 | 9/2016 | Ugolnikov et al. |
| 2016/0264753 A1 | 9/2016 | Salit et al. |
| 2017/0198114 A1 | 7/2017 | Araujo Da Silva et al. |
| 2017/0327617 A1 | 11/2017 | Araujo Da Silva et al. |
| 2018/0105630 A1 | 4/2018 | Rannoux et al. |
| 2022/0235164 A1* | 7/2022 | Dit Dominique ..... C08F 279/04 |

FOREIGN PATENT DOCUMENTS

| | | |
|---|---|---|
| CN | 105658675 A | 6/2016 |
| CN | 106536218 A | 3/2017 |
| EP | 1092731 A1 | 4/2001 |
| EP | 1554321 A1 | 7/2005 |
| EP | 1656400 A1 | 5/2006 |
| EP | 1954705 A2 | 8/2008 |
| EP | 1957506 A2 | 8/2008 |
| WO | 03002648 A1 | 1/2003 |
| WO | 03002649 A1 | 1/2003 |
| WO | 03016387 A1 | 2/2003 |
| WO | 2004035639 A1 | 4/2004 |
| WO | 2005028526 A1 | 3/2005 |
| WO | 2007054223 A2 | 5/2007 |
| WO | 2007054224 A2 | 5/2007 |
| WO | 2014114607 A1 | 7/2014 |
| WO | 2015059269 A1 | 4/2015 |
| WO | 2016087248 A1 | 6/2016 |
| WO | 2016162206 A1 | 10/2016 |

OTHER PUBLICATIONS

Brunauer et al., "Adsorption of Gases in Multimolecular Layers," Journal of the American Chemical Society, vol. 60, Feb. 1938, 11 pages.
Thuilliez et al., "ansa-Bis(fluorenyl)neodymium Catalysts for Cyclocopolymerization of Ethylene with Butadiene," Macromolecules, vol. 42, No. 11, 2009, 6 pages.

* cited by examiner

*Primary Examiner* — Hannah J Pak
(74) *Attorney, Agent, or Firm* — Dickinson Wright PLLC

(57) ABSTRACT

A diene elastomer and a rubber composition comprising the diene elastomer is provided. The diene elastomer bears pendent imidazole functions in a molar content of at most 4% of the constituent repeating units of the diene elastomer, which diene elastomer is a copolymer of ethylene and of a 1,3-diene comprising ethylene units, the ethylene units representing at least 50 mol % of the constituent repeating units of the diene elastomer, the 1,3-diene being 1,3-butadiene or isoprene. Such an elastomer confers improved uncured properties on the rubber composition.

14 Claims, No Drawings

FUNCTIONAL DIENE ELASTOMER AND RUBBER COMPOSITION

This application is a 371 national phase entry of PCT/FR2019/052647 filed on 7 Nov. 2019, which claims benefit of French Patent Application No. 1860355, filed 9 Nov. 2018, the entire contents of which are incorporated herein by reference for all purposes.

BACKGROUND

1. Technical Field

The present invention relates to highly saturated diene elastomers that can be used in reinforced diene rubber compositions intended to be used in particular in a tire.

2. Related Art

Diene elastomers are used in a known manner in rubber compositions for tires. They can also be used more specifically in rubber compositions intended to form assemblies of multiple rubber components. As such, mention may be made of rubber laminates which are formed of multiple layers of rubber compositions superimposed on one another. The assembly of multiple rubber components is generally carried out in the uncured state, which means that the rubber compositions constituting the rubber components are assembled before being crosslinked. In order to guarantee the dimensional stability of the assembly, in particular by minimizing the flow of the rubber components, the rubber compositions must exhibit high mechanical strength in the uncured state.

Highly saturated diene elastomers such as copolymers of ethylene and of 1,3-diene impart valuable properties to rubber compositions containing them, for example those constituting treads or laminates as described for example in patent applications WO 2014/114607 A1 and WO 2016/087248 A1.

SUMMARY

The applicant has discovered, surprisingly, that the mechanical strength properties in the uncured state of the rubber compositions containing highly saturated diene elastomers can be further improved, which makes the use of these rubber compositions even more advantageous, in particular in the production of an assembly of multiple rubber components. This aim is achieved by using a highly saturated diene elastomer bearing substituted or unsubstituted imidazole functions.

Thus, a first subject of the invention is a diene elastomer bearing pendent imidazole functions in a molar content of at most 4% of the constituent repeating units of the diene elastomer, which diene elastomer is a copolymer of ethylene and of a 1,3-diene comprising ethylene units, the ethylene units representing at least 50 mol % of the constituent repeating units of the diene elastomer, the 1,3-diene being 1,3-butadiene or isoprene.

A second subject of the invention is a rubber composition which comprises a diene elastomer in accordance with the invention and a reinforcing filler which contains a carbon black, a silica or a mixture of a carbon black and a silica.

The invention also relates to a tire comprising a rubber composition in accordance with the invention.

I. DETAILED DESCRIPTION

The abbreviation "phr" means parts by weight per hundred parts of elastomer (of the total of the elastomers if several elastomers are present).

Furthermore, any interval of values denoted by the expression "between a and b" represents the range of values greater than "a" and less than "b" (that is to say, limits a and b excluded), whereas any interval of values denoted by the expression "from a to b" means the range of values extending from "a" up to "b" (that is to say, including the strict limits a and b).

The compounds mentioned in the description may be of fossil or biobased origin. In the latter case, they can result, partially or completely, from biomass or be obtained from renewable starting materials resulting from biomass.

The elastomer in accordance with the invention is a copolymer of ethylene and of a 1,3-diene, the 1,3-diene being 1,3-butadiene or isoprene. It has the essential feature of comprising at least 50 mol % of the ethylene units, the molar percentage being relative to the total number of constituent repeating units of the diene elastomer. In a well-known manner, the ethylene units have the formula -($CH_2$-$CH_2$)-. Preferably, the ethylene units represent at least 65 mol % of the constituent repeating units of the diene elastomer. Even more preferentially, the ethylene units represent more than 70 mol % of the constituent repeating units of the diene elastomer.

The elastomer in accordance with the invention also has another essential feature of being a diene elastomer. The term "diene elastomer" is understood to mean an elastomer which comprises diene units. The term "diene unit" is understood to mean a unit which contains a carbon-carbon double bond and which results from the insertion of a diene monomer into the growing chain of the elastomer by polymerization reaction. In the case in point, the diene elastomer in accordance with the invention contains diene units resulting from the insertion of 1,3-butadiene or of isoprene. In a well-known manner, the polymerization of 1,3-butadiene can result in 1,2-butadiene units of formula —($CH_2$—CH=CH—$CH_2$)— or 1,4-butadiene units of formula —($CH_2$—CH(CH=$CH_2$))—. Also in a well-known manner, the polymerization of isoprene can result in 1,4-isoprene units of formula —($CH_2$—C($CH_3$)=CH—$CH_2$)— or 3,4-isoprene units of formula —($CH_2$—CH(C($CH_3$)=$CH_2$))— or else 1,2-isoprene units of formula ($CH_2$'C($CH_3$)(CH=$CH_2$))—. In the present invention, the diene elastomer in accordance with the invention typically contains, as units resulting from the insertion of 1,3-butadiene, 1,4-butadiene units, preferably trans-1,4-butadiene units, or 1,2-butadiene units, or else as units resulting from the insertion of isoprene, 1,4-isoprene units or 3,4-isoprene units. The 1,3-diene is preferably 1,3-butadiene.

According to one particular embodiment of the invention, the elastomer in accordance with the invention is a copolymer of ethylene and of 1,3-butadiene which contains units of formula (I) or (II), preferably of formula (I). The presence of a 6-membered cyclic structure in a copolymer of ethylene and of 1,3-butadiene results from a very particular insertion of the monomers that are ethylene and 1,3-butadiene, as is for example described in the document *Macromolecules* 2009, 42 (11), 3774-3779.

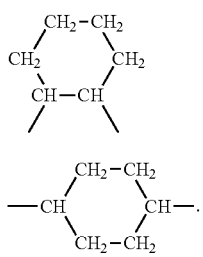

The elastomer in accordance with the invention, when it is a copolymer of ethylene and of 1,3-butadiene, preferably contains UA, UB, UC, UD and UE units according to the respective molar percentages m, n, o, p and q. The UA units are ethylene units, the UB and UC units being respectively 1,4-butadiene units and 1,2-butadiene units, the UD and UE units being of formula (I) and (II) respectively. The UA, UB, UC, UD and UE units are distributed randomly within the elastomer. The values of m, n, o, p and q are calculated on the basis of the sum of m+n+o+p+q, which is equal to 100, knowing that:

$m \geq 50$
$0 < o+p \leq 25$
$n+o > 0$
$o+p+q \geq 10$
$q \geq 0$ m, n, o, p and q being numbers ranging from 0 to 100.

The value of m is preferentially at least 65, more preferentially greater than 70.

The values of m, n, o, p and q vary more preferentially according to the ranges indicated below:

$m \geq 65$, more preferably $m > 70$
$n+o+p+q \geq 15$, more preferably 20
$10 \geq p+q \geq 2$
$1 \geq n/(o+p+q)$
when q is non-zero, $20 \geq p/q \geq 1$ According to another particular embodiment of the invention, the elastomer in accordance with the invention is a copolymer of ethylene and of isoprene which contains isoprene units of which at least 70% are in the 3,4 configuration. In the copolymer of ethylene and of isoprene, the isoprene units preferentially represent at least 10 mol % of the constituent repeating units of the diene elastomer, in particular from 10 to 35 mol % of the constituent repeating units of the diene elastomer, more preferentially from 10 mol % to less than 30 mol % of the constituent repeating units of the diene elastomer.

According to any one of the embodiments of the invention, the units resulting from the copolymerization of ethylene and of 1,3-diene are preferably distributed randomly in the elastomer in accordance with the invention.

The elastomer in accordance with the invention also has the other distinctive feature of bearing pendent groups. The pendent groups are imidazole functions. The pendent imidazole functions are present in the diene elastomer in a molar content of at most 4 mol % of the constituent repeating units of the diene elastomer. Preferably, the molar content of the pendent imidazole functions is at most 3 mol % of the constituent repeating units of the diene elastomer. Preferably, the molar content of the pendent imidazole functions is at least 0.05 mol % of the constituent repeating units of the diene elastomer. More preferentially, the molar content of the pendent imidazole functions varies in a range extending from 0.05 mol % to 3 mol % of the constituent repeating units of the diene elastomer. These preferential ranges of the molar content of the pendent imidazole functions can be applied to any one of the embodiments of the invention. In the present application, the constituent repeating units of the diene elastomer are typically the units resulting from the copolymerization of ethylene and of 1,3-diene, including the units that had been modified in that they bear a pendent imidazole function.

Preferably, the pendent imidazole functions are of formula (III)

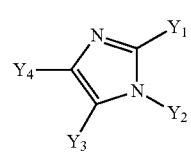

In formula (III), the symbols $Y_1$, $Y_2$, $Y_3$ and $Y_4$, which may be identical or different, represent a hydrogen atom or a substituent in the knowledge that one of the symbols $Y_1$, $Y_2$, $Y_3$ and $Y_4$ denotes an attachment to a diene unit of the diene elastomer. Preferably, a single symbol denotes an attachment to a diene unit of the elastomer. The attachment is direct, in which case the 5-membered ring of the imidazole function is bonded to the diene unit via a covalent bond, or the attachment is indirect, in which case one group covalently bonds the 5-membered ring of the imidazole function to the diene unit. In the present application, the term "group" is understood to mean a sequence of atoms covalently bonded to form a chain.

When neither $Y_3$, nor $Y_4$ denotes an attachment to a diene unit of the elastomer, $Y_3$ and $Y_4$ may form, with the two carbon atoms to which they are attached, a ring, in particular an aromatic ring.

Preferably, the symbol $Y_2$ denotes the attachment to a diene unit of the elastomer.

Preferably, the symbols $Y_3$ and $Y_4$ are each a hydrogen atom.

Preferably, the symbol $Y_1$ represents a hydrogen atom or a carbon chain which is preferentially an alkyl group. In the present application, a carbon chain is understood to mean a chain which contains one or more carbon atoms. Advantageously, $Y_1$ is a hydrogen atom or an alkyl group. When the symbol $Y_1$ represents an alkyl group, the alkyl group is preferentially an alkyl group which contains from 1 to 6 carbon atoms, more preferentially a methyl.

According to a very particularly preferential embodiment, the symbol $Y_2$ denotes the attachment to a diene unit of the elastomer, the symbols $Y_3$ and $Y_4$ are each a hydrogen atom and the symbol $Y_1$ represents a hydrogen atom or a carbon chain, preferentially an alkyl group, more preferentially an alkyl group containing 1 to 6 carbon atoms, even more preferentially a methyl.

According to any one of the embodiments of the invention, the pendent imidazole functions are preferably distributed randomly in the elastomer in accordance with the invention.

According to one particular embodiment of the invention, the elastomer in accordance with the invention may be a mixture of several elastomers which can be distinguished from each other by their microstructure and their macrostructure, as long as each of the elastomers is in accordance with the invention.

According to one particularly preferential embodiment of the invention, the elastomer in accordance with the invention is a diene elastomer, a portion of the diene units of which are modified by grafting a modifying agent which contains a group that is reactive with respect to carbon-carbon double bonds and a group of formula (IV) in which the symbols $Z_1$, $Z_2$, $Z_3$ and $Z_4$, which may be identical or different, represent a hydrogen atom or a substituent in the knowledge that at least one of the symbols $Z_1$, $Z_2$, $Z_3$ and $Z_4$ denotes an attachment to the reactive group. Preferably a single symbol denotes an attachment to the reactive group.

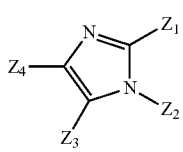

(IV)

When neither $Z_3$, nor $Z_4$ denotes an attachment to the reactive group, $Z_3$ and $Z_4$ may form, with the two carbon atoms to which they are attached, a ring, in particular an aromatic ring. The attachment is direct, in which case the imidazole function is bonded to the reactive group via a covalent bond, or the attachment is indirect, in which case one group covalently bonds the 5-membered ring of the imidazole function to the reactive group.

In formula (IV), the symbol $Z_2$ preferably denotes the attachment to the reactive group.

Preferably, the symbols $Z_3$ and $Z_4$ each represent a hydrogen atom.

Preferably, the symbol $Z_1$ represents a hydrogen atom or a carbon chain which is preferentially an alkyl group. Advantageously, $Z_1$ is a hydrogen atom or an alkyl group. When the symbol $Z_1$ represents an alkyl group, the alkyl group is preferentially an alkyl group which contains from 1 to 6 carbon atoms, more preferentially a methyl.

More preferentially, the symbol $Z_2$ denotes the attachment to the reactive group, the symbols $Z_3$ and $Z_4$ are each a hydrogen atom and the symbol $Z_1$ represents a hydrogen atom or a carbon chain, the carbon chain preferentially being an alkyl group, more preferentially an alkyl group containing 1 to 6 carbon atoms, even more preferentially a methyl.

The elastomer in accordance with the invention is, according to this particularly preferential embodiment of the invention, a modified diene elastomer which is obtained by modifying a starting diene elastomer by means of a reaction for grafting the modifying agent. The starting diene elastomer is typically a copolymer of ethylene and of 1,3-diene which can be obtained according to the various known synthesis methods, in particular in the presence of a catalytic system comprising a metallocene complex. In this respect, mention may be made of the catalytic systems based on metallocene complexes, which catalytic systems are described in documents EP 1 092 731 A1, EP 1 554 321 A1, EP 1 656 400 A1, EP 1 954 705 A1 and EP 1 957 506 A1 in the name of the applicants.

According to this particularly preferential embodiment of the invention, the elastomer in accordance with the invention comprises both diene units and diene units modified by the grafting of the modifying agent.

Preferably, the modifying agent is a 1,3-dipolar compound. The term "1,3-dipolar compound" is understood according to the definition given by the IUPAC. It has the feature of comprising a single dipole and the group of formula (IV). The dipole constitutes the reactive group of the modifying agent with respect to carbon-carbon double bonds. The dipole typically reacts with the carbon-carbon double bonds of the diene units. Bringing the starting diene elastomer together with the modifying agent leads to the modification of a portion of the diene units of the starting diene elastomer. The 1,3-dipolar compound of use for the requirements of the invention is preferably an aromatic nitrile monoxide. The term "aromatic nitrile monoxide compound" is understood to mean an aromatic compound which contains a single nitrile oxide dipole and a benzene ring, which benzene ring is substituted with the nitrile oxide dipole, which means that the carbon atom of the dipole is directly bonded via a covalent bond to a carbon atom of the benzene ring. Advantageously, the benzene ring is substituted in the position ortho to the dipole.

Advantageously, the 1,3-dipolar compound contains a unit of formula (V) in which four of the six symbols $R_1$ to $R_6$, which may be identical or different, are a hydrogen atom or a substituent, knowing that the fifth symbol represents an attachment to the group of formula (IV) and the sixth symbol a direct attachment to the dipole.

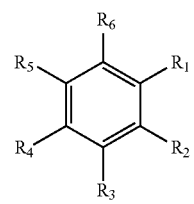

(V)

In formula (V), the $R_1$ and $R_5$ symbols are preferably both other than a hydrogen atom, which makes it possible to confer a greater stability of the 1,3-dipolar compound and thus an easier use of the 1,3-dipolar compound.

In formula (V), the symbols $R_1$, $R_3$ and $R_5$ each preferably represent a hydrocarbon-based group, more preferentially an alkyl group, more preferentially still a methyl or ethyl group.

In formula (V), the $R_2$ and $R_4$ symbols are each preferentially a hydrogen atom.

In formula (V), the symbols $R_1$, $R_3$ and $R_5$ each preferably represent a hydrocarbon-based group, more preferentially an alkyl group, more preferentially still a methyl or ethyl group and the symbols $R_2$ and $R_4$ are each preferentially a hydrogen atom. With a benzene ring thus substituted, the synthesis of the 1,3-dipolar compound may then be carried out using a relatively easy synthesis route using a commercially available precursor, for example mesitylene, as is described in particular in document WO 2015/059269.

In formula (V), the fifth symbol is attached to the group of formula (IV) preferably via a carbon chain which preferentially contains 1 to 6 carbon atoms, more preferentially 1 to 3 carbon atoms. The carbon chain which preferentially contains 1 to 6 carbon atoms, more preferentially 1 to 3 carbon atoms, which allows the fifth symbol to be attached to the group of formula (IV) is advantageously an alkanediyl chain, better still a methanediyl chain.

According to any one of the embodiments of the invention, the 1,3-dipolar compound is advantageously the compound 2,4,6-trimethyl-3-((2-methyl-1H-imidazol-1-yl)methyl)benzonitrile oxide of formula (V-a) or the compound 2,4,6-triethyl-3-((2-methyl-1H-imidazol-1-yl)methyl)benzonitrile oxide of formula (V-b), more advantageously the compound of formula (V-a).

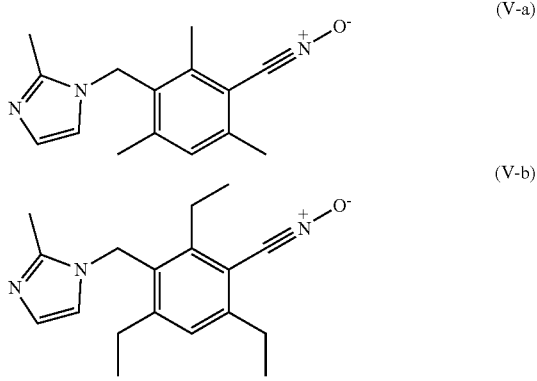

(V-a)

(V-b)

The diene elastomer in accordance with the invention can be used in a rubber composition, in particular for tires.

Another essential feature of the rubber composition which comprises the diene elastomer in accordance with the invention is that it comprises a reinforcing filler.

The rubber composition contains a "reinforcing" filler, known for its ability to reinforce a rubber composition which can be used for the manufacture of tires, such as a carbon black or a silica with which a coupling agent is associated in a known manner, or else a mixture of these two types of filler, the two types of filler being, in the rubber composition, in an amount by weight which may or may not be equal. Such a reinforcing filler typically consists of nanoparticles, the (weight-)average size of which is less than a micrometre, generally less than 500 nm, most often between 20 and 200 nm, in particular and more preferentially between 20 and 150 nm. The reinforcing filler can be used in a content of between 25 and 200 phr. The content of reinforcing filler is adjusted by those skilled in the art according to the envisaged use of the rubber composition.

Suitable carbon blacks are all carbon blacks, in particular the blacks conventionally used in tires (referred to as tire grade blacks). Among the latter, mention will more particularly be made of the reinforcing carbon blacks of the 100, 200 and 300 series, or the blacks of the 500, 600 or 700 series (ASTM grades), such as, for example, the N115, N134, N234, N326, N330, N339, N347, N375, N550, N683 and N772 blacks. These carbon blacks can be used in the isolated state, as commercially available, or in any other form, for example as support for some of the rubber additives used.

The silica used may be any reinforcing silica known to those skilled in the art, especially any precipitated or fumed silica having a BET surface area and also a CTAB specific surface area both of less than 450 m²/g, preferably from 30 to 400 m²/g, especially between 60 and 300 m²/g. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Solvay, the Hi-Sil EZ150G silica from PPG, the Zeopol 8715, 8745 and 8755 silicas from Huber or the silicas with a high specific surface area as described in application WO 03/016387.

In the present account, the BET specific surface area is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure p/p₀ range: 0.05 to 0.17). The CTAB specific surface area is the external surface area determined according to French Standard NF T 45-007 of November 1987 (method B).

In order to couple the silica to the diene elastomer, use is made, in a well-known way, of an at least bifunctional coupling agent, in particular a silane, (or bonding agent) intended to provide a satisfactory connection, of chemical and/or physical nature, between the silica (surface of its particles) and the diene elastomer. Use is made in particular of organosilanes or polyorganosiloxanes which are at least bifunctional. Use is made especially of silane polysulfides, referred to as "symmetrical" or "asymmetrical" depending on their specific structure, such as described, for example, in applications WO 03/002648 (or US 2005/016651) and WO 03/002649 (or US 2005/016650).

Particularly suitable, without the definition below being limiting, are silane polysulfides corresponding to the general formula (VI):

in which:
x is an integer from 2 to 8 (preferably from 2 to 5);
the A symbols, which may be identical or different, represent a divalent hydrocarbon-based radical (preferably a $C_1$-$C_{18}$ alkylene group or a $C_6$-$C_{12}$ arylene group, more particularly a $C_1$-$C_{10}$, especially $C_1$-$C_4$, alkylene, in particular propylene);
the Z symbols, which may be identical or different, correspond to one of the three formulae below:

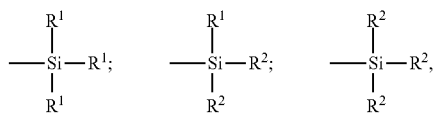

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-C8 alkoxyls and $C_5$-$C_8$ cycloalkoxyls, more preferably still a group selected from $C_1$-$C_4$ alkoxyls, in particular methoxyl and ethoxyl).

Mention will more particularly be made, as examples of silane polysulfides, of bis(($C_1$-$C_4$)alkoxyl($C_1$-$C_4$)alkylsilyl ($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$.

The content of coupling agent is adjusted by those skilled in the art according to the content of silica used in the composition.

In the rubber composition in accordance with the invention, the reinforcing filler comprises a carbon black or a silica or a mixture of a carbon black and a silica.

According to one embodiment of the invention, the silica represents more than 50% by weight of the weight of the reinforcing filler of the rubber composition. According to this embodiment, the reinforcing filler may also comprise a carbon black, the carbon black being preferably used in a content of less than 20 phr, more preferentially less than 10 phr (for example between 0.5 and 20 phr, in particular between 2 and 10 phr). Within the intervals indicated, the colouring properties (black pigmenting agent) and UV-stabilizing properties of the carbon blacks are beneficial, without, moreover, adversely affecting the typical performance qualities contributed by the reinforcing inorganic filler.

According to another embodiment of the invention, the carbon black represents more than 50% by weight of the weight of the reinforcing filler of the rubber composition.

The rubber composition may contain an elastomer other than that in accordance with the invention, in particular a diene elastomer conventionally used in rubber compositions. The rubber composition preferentially comprises more than 50 phr, more preferentially more than 80 phr of the elastomer in accordance with the invention defined according to any one of the embodiments of the invention.

The rubber composition may contain a crosslinking system for the purpose of crosslinking the elastomer(s) present in the rubber composition. The crosslinking system can be a vulcanization system or be based on one or more peroxide compounds, for example conventionally used in rubber compositions that can be used for the manufacture of tires. The crosslinking system is preferentially a vulcanization system, that is to say a system based on sulfur (or on a sulfur donor) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), or also known vulcanization retarders, incorporated during the first non-productive phase and/or during the productive phase, such as described subsequently. The sulfur is used at a preferential content of between 0.5 and 12 phr, in particular between 0.5 and 10 phr. The primary vulcanization accelerator is used at a preferential content of between 0.5 and 10 phr, more preferentially of between 0.5 and 5.0 phr.

The rubber composition can additionally contain other additives known to be used in rubber compositions for tires, such as plasticizers, antiozonants or antioxidants.

The rubber composition in accordance with the invention is typically manufactured in appropriate mixers, using two successive phases of preparation well known to those skilled in the art: a first phase of thermomechanical working or kneading ("non-productive" phase) at high temperature, up to a maximum temperature of between 130° C. and 200° C., followed by a second phase of mechanical working ("productive" phase) up to a lower temperature, typically of less than 110° C., for example between 40° C. and 100° C., during which finishing phase the crosslinking system is incorporated.

The rubber composition in accordance with the invention, which can be either in the uncured state (before crosslinking or vulcanization) or in the cured state (after crosslinking or vulcanization), can be used in a tire semi-finished article.

The essential feature of the tire according to the invention is that it comprises a rubber composition in accordance with the invention.

In summary, the invention is advantageously implemented according to any one of the following modes 1 to 35:

Mode 1: Diene elastomer bearing pendent imidazole functions in a molar content of at most 4% of the constituent repeating units of the diene elastomer, which diene elastomer is a copolymer of ethylene and of a 1,3-diene comprising ethylene units, the ethylene units representing at least 50 mol % of the constituent repeating units of the diene elastomer, the 1,3-diene being 1,3-butadiene or isoprene.

Mode 2: Diene elastomer according to mode 1, in which the ethylene units represent at least 65 mol % of the constituent repeating units of the diene elastomer.

Mode 3: Diene elastomer according to mode 1 or 2, in which the ethylene units represent more than 70 mol % of the constituent repeating units of the diene elastomer.

Mode 4: Diene elastomer according to any one of modes 1 to 3, in which the 1,3-diene is 1,3-butadiene.

Mode 5: Diene elastomer according to any one of modes 1 to 4, which diene elastomer is a copolymer of ethylene and of 1,3-butadiene which contains units of formula (I) or (II), preferably of formula (I).

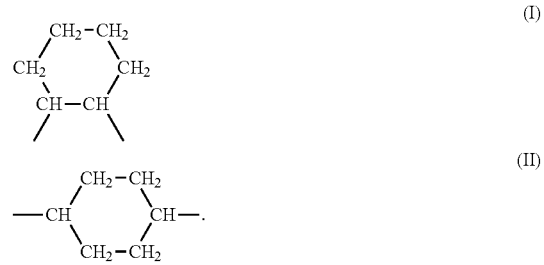

Mode 6: Diene elastomer according to any one of modes 1 to 3, which diene elastomer is a copolymer of ethylene and of isoprene which contains isoprene units of which at least 70% are in the 3,4 configuration.

Mode 7: Diene elastomer according to mode 6, in which the isoprene units represent at least 10 mol % of the constituent repeating units of the diene elastomer.

Mode 8: Diene elastomer according to any one of modes 1 to 7, in which the units resulting from the copolymerization of ethylene and of 1,3-diene are preferably distributed randomly in the elastomer in accordance with the invention.

Mode 9: Diene elastomer according to any one of modes 1 to 8, in which the molar content of the pendent imidazole functions is at most 3% of the constituent repeating units of the diene elastomer.

Mode 10: Diene elastomer according to any one of modes 1 to 9, in which the molar content of the pendent imidazole functions is at least 0.05 mol % of the constituent repeating units of the diene elastomer.

Mode 11: Diene elastomer according to any one of modes 1 to 10, in which the pendent imidazole functions are of formula (III)

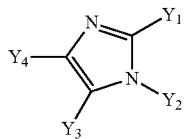

in which:
the symbols $Y_1$, $Y_2$, $Y_3$ and $Y_4$, which may be identical or different, represent a hydrogen atom or a substituent, knowing that one of the symbols denotes an attachment to a diene unit of the diene elastomer.

Mode 12: Diene elastomer according to mode 11, in which $Y_2$ denotes the attachment to a diene unit of the diene elastomer.

Mode 13: Diene elastomer according to mode 11 or 12, in which $Y_3$ and $Y_4$ are each a hydrogen atom.

Mode 14: Diene elastomer according to any one of modes 11 to 13, in which $Y_1$ is a hydrogen atom or a carbon chain which is preferentially an alkyl group.

Mode 15: Diene elastomer according to mode 14, in which the alkyl group represented by $Y_1$ contains from 1 to 6 carbon atoms.

Mode 16: Diene elastomer according to mode 14 or 15, in which the alkyl group represented by $Y_1$ is a methyl group.

Mode 17: Diene elastomer according to any one of modes 1 to 16, which diene elastomer is a diene elastomer, a portion of the diene units of which are modified by grafting a modifying agent which contains a group that is reactive with respect to carbon-carbon double bonds and a group of formula (IV)

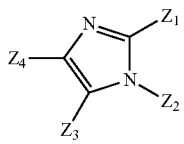

in which the symbols $Z_1$, $Z_2$, $Z_3$ and $Z_4$, which may be identical or different, represent a hydrogen atom or a substituent, knowing that at least one of the symbols $Z_1$, $Z_2$, $Z_3$ and $Z_4$ denotes an attachment to the reactive group.

Mode 18: Diene elastomer according to mode 17, in which $Z_2$ denotes the attachment to the reactive group.

Mode 19: Diene elastomer according to either one of modes 17 and 18, in which $Z_3$ and $Z_4$ each represent a hydrogen atom.

Mode 20: Diene elastomer according to any one of modes 17 to 19, in which $Z_1$ is a hydrogen atom or a carbon chain which is preferentially an alkyl group.

Mode 21: Diene elastomer according to mode 20, in which the alkyl group represented by $Z_1$ contains 1 to 6 carbon atoms.

Mode 22: Diene elastomer according to either one of modes 20 and 21, in which the alkyl group represented by $Z_1$ is a methyl group.

Mode 23: Diene elastomer according to any one of modes 17 to 22, in which the modifying agent is a 1,3-dipolar compound.

Mode 24: Diene elastomer according to mode 23, in which the 1,3-dipolar compound is an aromatic nitrile monoxide, which aromatic compound contains a single nitrile oxide dipole and a benzene ring, which benzene ring is substituted by the nitrile oxide dipole.

Mode 25: Diene elastomer according to mode 24, in which the benzene ring is substituted in the position ortho to the dipole.

Mode 26: Diene elastomer according to any one of modes 23 to 25, in which the 1,3-dipolar compound contains a unit of formula (V)

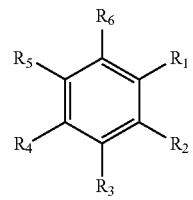

in which four of the six symbols $R_1$ to $R_6$, which may be identical or different, are a hydrogen atom or a substituent, knowing that the fifth symbol represents an attachment to the group of formula (IV) and the sixth symbol a direct attachment to the dipole.

Mode 27: Diene elastomer according to mode 26, in which $R_1$ and $R_5$ are both other than a hydrogen atom.

Mode 28: Diene elastomer according to either one of modes 26 and 27, in which $R_1$, $R_3$ and $R_5$ each represent a hydrocarbon-based group, preferably an alkyl group, more preferentially a methyl or ethyl group.

Mode 29: Diene elastomer according to any one of modes 26 to 28, in which $R_2$ and $R_4$ are each a hydrogen atom.

Mode 30: Diene elastomer according to any one of modes 26 to 29, in which the fifth symbol is attached to the group of formula (IV) via a carbon chain, preferably an alkanediyl chain, more preferentially a methanediyl chain.

Mode 31: Rubber composition which comprises a diene elastomer defined in any one of modes 1 to 30 and a reinforcing filler which contains a carbon black or a silica or a mixture of a carbon black and a silica.

Mode 32: Rubber composition according to mode 31, in which the silica represents more than 50% by weight of the weight of the reinforcing filler.

Mode 33: Rubber composition according to mode 31, in which the carbon black represents more than 50% by weight of the weight of the reinforcing filler.

Mode 34: Rubber composition according to any one of modes 31 to 33, which rubber composition also comprises a crosslinking system, preferably a vulcanization system.

Mode 35: Tire which comprises a rubber composition defined in any one of modes 31 to 34.

The abovementioned features of the present invention, and also others, will be understood more clearly on reading the following description of several implementation examples of the invention, which are given as non-limiting illustrations.

II. EXAMPLES

II.1-Measurement and Test Used

1) Obtaining of the Force-Elongation Curves of Non-Crosslinked Test Specimens:
1a) Preparation of Slabs Consisting of Non-Crosslinked Rubber Compositions:
The composition passes through a calender, the rolls of which are at 75° C. so as to be in the form of a 2.9 mm thick sheet. This sheet is moulded under pressure in a mould for 10 minutes at 110° C. between two polyester sheets, then extracted from the mould and finally cooled in the open air. A 2.5 mm thick slab is thus obtained.

1b) Conditioning of the Slabs Obtained:

Between the time of their preparation and that of the tensile test, each slab is stored in an ambient atmosphere for a duration at least equal to 5 hours and that cannot exceed 8 days.

1c) Preparation of Test Specimens from These Slabs:

Each test specimen is then immediately cut in the shape of a dumbbell from one of the slabs thus extracted from the mould, so that it has two ends connected to one another by a rod of thickness E =2.5 mm, of length L =26 mm and of width W =6 mm. The cutting is carried out in such a way that the longitudinal direction L of the test specimen is parallel to the calendering direction.

1d) Tensile Tests:

At least three identical test specimens are tested under the same conditions for each of the tensile tests performed.

Each tensile test consists in pulling each test specimen at a constant speed and in recording the change in the tensile force as a function of the displacement of a moving jaw of an INSTRON 4501 tensile machine. This machine is equipped with a force sensor and a means for measuring the displacement of this moving jaw. Each test specimen is held in its broadest part under a clamping pressure P equal to 2 bar.

Each tensile test is carried out at ambient temperature, in an air-conditioned laboratory at 23° C. (±2° C.) and at 50% (±10%) humidity. The constant speed of displacement of the moving jaw is 100 mm/minute. The variations in the tensile force and the displacement of the moving jaw are recorded during each test.

For each test specimen, the following parameters are calculated:

relative deformation $\alpha(\%)=100\times D/L$ (D is the displacement of the moving jaw in mm), measured by the sensor of the machine during each test, and L=26 mm is the initial length of the test specimen imposed by "the punch"), and apparent stress $F/S_0$ (MPa), which represents the ratio of the force (in N), measured by the sensor of the machine, to the initial cross section $S_0$ of the test specimen ($S_0=W\cdot E$ in mm$^2$, W=6 mm being the width imposed by "the punch" and E=2.5 mm being the thickness of the test specimen before pulling).

For each degree of relative deformation, the average of the corresponding stresses was calculated for three identical test specimens, and thus a stress (average of three measurements)-deformation graph was plotted for each of the test specimens tested. The results are given in base 100 relative to a control. A value greater than 100 indicates a value greater than that of the control.

2) Determination of the Microstructure and the Function Content of the Elastomers by Nuclear Magnetic Resonance (NMR):

The microstructure is determined by $^1$H NMR. The molar content of grafted nitrile oxide compound is also determined by NMR analysis. The samples are dissolved in deuterated tetrahydrofuran THF with the aim of obtaining a "lock" signal. The spectra are acquired on a 500 MHz Bruker spectrometer equipped with a "5 mm BBFO Z-grad Cryo-Probe". The quantitative $^1$H NMR experiment uses a simple 30° pulse sequence and a repetition time of 5 seconds between each acquisition. 2D NMR experiments made it possible to confirm the nature of the grafted unit by virtue of the chemical shifts of the carbon and proton atoms.

II.2-Preparation of the Elastomers

Six elastomers E1, E2, E3, E4, E5, and E6 are prepared as indicated below.

The elastomer E1 is a diene elastomer which is a copolymer of ethylene and of 1,3-butadiene in which the ethylene units and the cyclic units of formula (I) represent respectively 79.3 mol % and 7 mol % of the constituent repeating units of the copolymer. The butadiene units are in the 1,2 and 1,4 form respectively in contents of 63% and 37%. The diene elastomer E1 lacks an imidazole function. It is not in accordance with the invention. It is prepared in the presence of a catalytic system based on a metallocene [Me$_2$Si(Flu)$_2$Nd(μ-BH$_4$)$_2$Li (THF)] and a cocatalyst, butyloctylmagnesium, according to the following procedure:

The cocatalyst (0.36 mmol/l) and then the metallocene (0.07 mol/l) are added to a reactor containing methylcyclohexane. The alkylation time is 10 minutes, the reaction temperature is 20° C. The ethylene and the 1,3-butadiene are then added continuously to the reactor, in the respective molar amounts of 80% and 20%. The polymerization is carried out at 80° C. under a pressure of 8 bar. The polymerization reaction is stopped by cooling, degassing of the reactor and addition of ethanol. An antioxidant is added to the polymer solution. The copolymer is recovered by drying in an oven under vacuum to constant weight.

The elastomers E2, E3 and E4 are prepared by grafting the 1,3-dipolar compound 2,4,6-trimethyl-3((2-methyl-1H-imidazol-1-yl)methyl)benzonitrile oxide onto the elastomer E1, according to the following procedure: in an internal mixer, the diene elastomer E1 is kneaded for 2 minutes at 110° C. with the 1,3-dipolar compound in the following contents: 2.16 phr for the elastomer E2 (which corresponds to a degree of molar grafting, determined by $^1$H NMR, of 0.2 mol of grafted modifying agent per 100 mol of monomer unit of polymer E2), 16.16 phr for the elastomer E3 (which corresponds to a degree of molar grafting, determined by $^1$H NMR, of 1.5 mol of grafted modifying agent per 100 mol of monomer unit of polymer E3) and 14.47 phr for the elastomer E4 (which corresponds to a degree of molar grafting, determined by $^1$H NMR, of 1.2 mol of grafted modifying agent per 100 mol of monomer unit of polymer E4). The elastomers E2, E3 and E4 are in accordance with the invention.

The elastomer E5 is a diene elastomer which is a copolymer of ethylene and of isoprene which contains 73.3 mol % of the constituent repeating units of the copolymer of ethylene and 26.7 mol % of the constituent repeating units of the copolymer of isoprene. The isoprene is present in 3,4, 1,2 and 1,4 form in the following proportions: 75% in 3,4 form, 2% in 1,2 form and 23% in 1,4 form.

The elastomer E5 lacks an imidazole function. It is not in accordance with the invention. It is prepared in the presence of a catalytic system based on a metallocene [Me$_2$Si(Flu)$_2$Nd(μ-BH$_4$)$_2$Li (THF)] and a cocatalyst, butyloctylmagnesium, according to the following procedure: The cocatalyst (0.18 mmol/l) and then the metallocene (0.06 mol/l) are added to a reactor containing methylcyclohexane. The alkylation time is 10 minutes, the reaction temperature is 20° C. The ethylene and the isoprene are then added continuously to the reactor, in the respective molar amounts of 65% and 35%. The polymerization is carried out at 80° C. under a pressure of 8 bar. The polymerization reaction is stopped by cooling, degassing of the reactor and addition of ethanol. An antioxidant is added to the polymer solution. The copolymer is recovered by drying in an oven under vacuum to constant weight.

The elastomer E6 is prepared by grafting the 1,3-dipolar compound 2,4,6-trimethyl-3-((2-methyl-1H-imidazol-1-yl) methyl)benzonitrile oxide onto the elastomer E5, according to the following procedure: in an internal mixer, the diene elastomer E5 is kneaded for 2 minutes at 110° C. with the 1,3-dipolar compound in a content of 13.98 phr (which corresponds to a degree of molar grafting, determined by $^1$H NMR, of 1.7 mol of grafted modifying agent per 100 mol of monomer unit of polymer E6). The elastomer E6 is in accordance with the invention.

II.3-Preparation of the Rubber Compositions

Seven rubber compositions C1 to C7 are prepared. Their formulation is given in Table 1.

For the production of the rubber compositions, the procedure is as follows: the diene elastomer is introduced into an internal mixer (final degree of filling: approximately 70% by volume), the initial tank temperature of which is approximately 110° C., followed by the reinforcing filler, and also the various other ingredients with the exception of the vulcanization system. Thermomechanical working (nonproductive phase) is then carried out in one step, which lasts approximately 5 min to 6 min, until a maximum "dropping" temperature of 160° C. is reached. The mixture thus obtained is recovered and cooled and then sulfur and an accelerator of sulfenamide type are incorporated on a mixer (homofinisher) at 25° C., everything being mixed (productive phase) for an appropriate time (for example between 5 and 12 min).

The compositions thus obtained are subsequently calendered in the form of slabs (with a thickness ranging from 2 to 3 mm) or of thin sheets of rubber, for the measurement of their physical or mechanical properties.

The rubber compositions C2, C3, C5 and C7 are rubber compositions in accordance with the invention, since they contain a diene elastomer in accordance with the invention, respectively the elastomers E2, E3, E4 and E6.

The rubber compositions C1 and C4 which comprise a reinforcing filler, respectively a silica and a carbon black, are control rubber compositions, since they contain the elastomer E1, a copolymer of ethylene and of 1,3-butadiene devoid of imidazole function. The rubber composition C6 which contains the diene elastomer E5 is also a control rubber composition in the case of the copolymers of ethylene and of isoprene.

II.4-Results

The values of the deformations and the breaking stresses of the compositions are summarized in Table 2.

In the case of a copolymer of ethylene and of 1,3-butadiene, the uncured reinforcement of the rubber compositions is very greatly improved for the compositions C2 and C3 compared to the control composition C1 and for the composition C5 compared to the control composition C4. In fact, the values of the breaking stresses of the rubber compositions before they are crosslinked are very high compared to their respective control.

In the case of a copolymer of ethylene and of isoprene, the uncured reinforcement of the composition of C7 is also improved compared to the control composition C6.

Surprisingly, it is observed that the presence of pendent imidazole functions on the diene elastomer, whether it is a copolymer of ethylene and of 1,3-butadiene or a copolymer of ethylene and of isoprene, makes it possible to improve the uncured mechanical properties of the rubber compositions reinforced with a silica or a carbon black, such as the uncured reinforcement. This increase in the uncured reinforcement of the rubber compositions in accordance with the invention makes the use of the elastomers and of the compositions in accordance with the invention advantageous in the production of assemblies of multiple rubber components.

TABLE 1

| Composition | C1 | C2 | C3 | C4 | C5 | C6 | C7 |
|---|---|---|---|---|---|---|---|
| E1 | 100 | | | 100 | | | |
| E2 | | 100 | | | | | |
| E3 | | | 100 | | | | |
| E4 | | | | | 100 | | |
| E5 | | | | | | 100 | |
| E6 | | | | | | | 100 |
| Carbon black (1) | | | | 40 | 40 | | |
| Silica (2) | 60 | 60 | 60 | | | 60 | 60 |
| Silane (3) | 4.8 | 4.8 | 4.8 | | | 4.8 | 4.8 |
| Antioxidant (4) | 2 | 2 | 2 | 2 | 2 | 2 | 2 |
| Stearic acid (5) | 2.5 | 2.5 | 2.5 | 1.5 | 1.5 | 2.5 | 2.5 |
| Paraffin wax | | | | 1 | 1 | | |
| ZnO (6) | 2 | 2 | 2 | 2.5 | 2.5 | 2 | 2 |
| S | 1 | 1 | 1 | 0.56 | 0.56 | 1 | 1 |
| CBS (7) | 2 | 2 | 2 | 1.26 | 1.26 | 2 | 2 |

(1) N234
(2) Silica 160MP
(3) TESPT (Si69, Degussa)
(4) N-(1,3-Dimethylbutyl)-N-phenyl-para-phenylenediamine (Santoflex 6-PPD from Flexsys)
(5) Stearin, Pristerene 4931 from Uniqema
(6) Zinc oxide, industrial grade from Umicore
(7) N-Cyclohexyl-2-benzothiazolesulfenamide from Flexsys

TABLE 2

| Uncured properties at 23° C. | C1 | C2 | C3 | C4 | C5 | C6 | C7 |
|---|---|---|---|---|---|---|---|
| Elongation at break (%) | 100 | 182 | 360 | 100 | 713 | 100 | 118 |
| Breaking stress (MPa) | 100 | 253 | >1000 | 100 | 860 | 100 | 500 |

The invention claimed is:

1. A diene elastomer bearing pendant imidazole functions in a molar content of at least 0.05 to 4 mol % of the constituent repeating units of the diene elastomer, wherein the diene elastomer is a copolymer of ethylene and of 1,3-butadiene which contains units of formula (I) or formula (II)

(I)

(II)

the ethylene units representing at least 50 mol % of the constituent repeating units of the diene elastomer, and wherein the pendant imidazole functions are of formula (III)

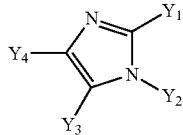
(III)

in which the symbols $Y_1$, $Y_2$, $Y_3$ and $Y_4$, which may be identical or different, represent a hydrogen or a substituent, and one of the symbols $Y_1$, $Y_2$, $Y_3$ and $Y_4$ denotes an attachment to a diene unit which is one of a plurality of diene units of the diene elastomer, a portion of the diene units of the diene elastomer are modified by grafting a modifying agent which contains a group that is reactive with respect to carbon-carbon double bonds and a group of formula (IV)

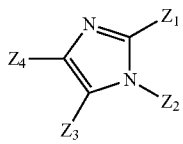
(IV)

in which the symbols $Z_1$, $Z_2$, $Z_3$ and $Z_4$, which may be identical or different, represent a hydrogen atom or a substituent, and at least one of the symbols $Z_1$, $Z_2$, $Z_3$ and $Z_4$ denotes an attachment to the reactive group.

2. The diene elastomer according to claim 1, in which the ethylene units represent at least 65 mol % of the constituent repeating units of the diene elastomer.

3. The diene elastomer according to claim 1, in which $Y_3$ and $Y_4$ are each a hydrogen atom, and $Y_1$ is a hydrogen atom or a carbon chain.

4. The diene elastomer according to claim 1, in which $Z_3$ and $Z_4$ each represent a hydrogen atom, and $Z_1$ is a hydrogen atom or a carbon chain.

5. The diene elastomer according to claim 1, in which the modifying agent is a 1,3-dipolar compound.

6. The diene elastomer according to claim 5, in which the 1,3-dipolar compound contains a unit of formula (V)

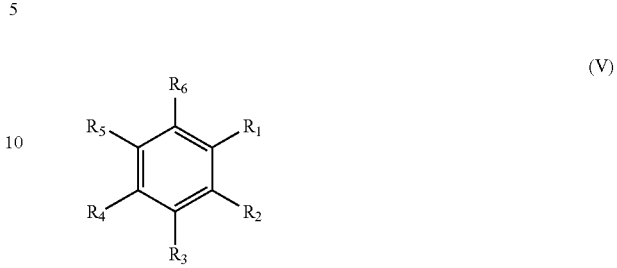
(V)

in which four of the six symbols $R_1$ to $R_6$, which may be identical or different, are a hydrogen atom or a substituent, wherein $R_5$ represents an attachment to the group of formula (IV) and $R_6$ represents a direct attachment to a dipole.

7. The diene elastomer according to claim 6, in which $R_1$, $R_3$ and $R_5$ each represent the substituent, and the substituent is a hydrocarbon-based group.

8. The diene elastomer according to claim 6, in which $R_5$ is attached to the group of formula (IV) via a carbon chain.

9. A rubber composition which comprises the diene elastomer defined in claim 1 and a reinforcing filler which comprises a carbon black, a silica or a mixture of a carbon black and a silica.

10. A tire which comprises the rubber composition defined in claim 9.

11. The diene elastomer according to claim 2, in which the ethylene units represent at least 70 mol % of the constituent repeating units of the diene elastomer.

12. The diene elastomer according to claim 1, wherein the symbol $Y_2$ denotes an attachment to a diene unit of the diene elastomer.

13. The diene elastomer according to claim 3, in which $Y_1$ is an alkyl group.

14. The diene elastomer according to claim 1, in which the symbol $Z_2$ denotes an attachment to the reactive group.

\* \* \* \* \*